United States Patent
Nilles (10) Patent No.: US 9,472,965 B2
(45) Date of Patent: Oct. 18, 2016

(54) BATTERY CYCLE LIFE THROUGH SMART OVERNIGHT CHARGING

(71) Applicant: GOOGLE TECHNOLOGY HOLDINGS LLC, Mountain View, CA (US)

(72) Inventor: Gerald M. Nilles, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 205 days.

(21) Appl. No.: 14/479,679

(22) Filed: Sep. 8, 2014

(65) Prior Publication Data

US 2016/0072326 A1  Mar. 10, 2016

(51) Int. Cl.
 *H02J 7/00* (2006.01)

(52) U.S. Cl.
 CPC ............ *H02J 7/0044* (2013.01); *H02J 7/0052* (2013.01)

(58) Field of Classification Search
 USPC ....................................................... 320/114
 See application file for complete search history.

(56) References Cited

U.S. PATENT DOCUMENTS

| | | | |
|---|---|---|---|
| 2,499,663 A | 3/1950 | Medlar | |
| 2,529,038 A | 11/1950 | Medlar et al. | |
| 2,563,234 A | 8/1951 | Godshalk et al. | |
| 2,627,060 A | 1/1953 | Berg | |
| 2,637,836 A | 5/1953 | Kendall et al. | |
| 3,678,363 A | 7/1972 | Ringle | |
| 4,061,956 A | 12/1977 | Brown et al. | |
| 4,082,097 A | 4/1978 | Mann et al. | |
| 4,629,965 A | 12/1986 | Fallon et al. | |
| 4,649,333 A | 3/1987 | Moore | |
| 4,692,682 A | 9/1987 | Lane et al. | |
| 4,712,055 A | 12/1987 | Houser, Jr. | |
| 4,727,306 A | 2/1988 | Misak et al. | |
| 4,745,349 A | 5/1988 | Palanisamy et al. | |
| 5,012,176 A | 4/1991 | LaForge | |
| 5,136,231 A | 8/1992 | Faulk | |
| 5,166,596 A | 11/1992 | Goedken | |
| 5,172,044 A | 12/1992 | Sasaki et al. | |
| 5,179,335 A | 1/1993 | Nor | |
| 5,185,566 A | 2/1993 | Goedken | |

(Continued)

FOREIGN PATENT DOCUMENTS

DE  10118189  11/2002
EP  1298809  4/2003

(Continued)

OTHER PUBLICATIONS

"3GTPP TS 36.213 V9.3.0 3rd Generation Partnership Project Technical Speficiation Group Radio Access Network", Evolved Universal Terrestrial Radio Access (E-UTRA); Physical layer procedures (Release 9), Sep. 2010, 80 pages.

(Continued)

*Primary Examiner* — Yalkew Fantu
(74) *Attorney, Agent, or Firm* — Wolfe-SBMC (57) ABSTRACT

A rechargeable mobile terminal is provided that provides a maximum charge rate of a rechargeable battery during active user hours of the day and provides the potential for applying a decreased charge rate of the rechargeable battery when the mobile terminal determines that the user has set the alarm clock function of the mobile terminal and that the time between the present time and the set alarm time (the delta time) is greater than an amount of time required to charge the rechargeable battery at a maximum charge rate.

18 Claims, 3 Drawing Sheets

(56) References Cited

U.S. PATENT DOCUMENTS

| | | | |
|---|---|---|---|
| 5,363,031 A | 11/1994 | Miller et al. | |
| 5,481,175 A | 1/1996 | Qualich et al. | |
| 5,504,416 A | 4/1996 | Holloway et al. | |
| 5,523,667 A | 6/1996 | Feldstein | |
| 5,600,230 A * | 2/1997 | Dunstan | H02J 7/0004 320/DIG. 21 |
| 5,640,059 A | 6/1997 | Kammiller et al. | |
| 5,656,920 A | 8/1997 | Cherng et al. | |
| 5,731,694 A | 3/1998 | Wilcox et al. | |
| 5,736,834 A | 4/1998 | Kuno | |
| 5,804,944 A | 9/1998 | Alberkrack et al. | |
| 5,815,389 A | 9/1998 | Plow et al. | |
| 5,900,718 A | 5/1999 | Tsenter | |
| 6,094,033 A | 7/2000 | Ding et al. | |
| 6,144,186 A | 11/2000 | Thandiwe et al. | |
| 6,236,189 B1 * | 5/2001 | Franke | G01R 19/16542 320/135 |
| 6,275,006 B1 | 8/2001 | Kolke et al. | |
| 6,298,233 B1 | 10/2001 | Souissi et al. | |
| 6,330,455 B1 | 12/2001 | Ichihara | |
| 6,470,003 B1 | 10/2002 | Smith et al. | |
| 6,495,992 B1 | 12/2002 | Pavlovic | |
| 6,639,462 B1 | 10/2003 | Luu | |
| 6,771,051 B2 | 8/2004 | Oglesbee et al. | |
| 6,803,746 B2 | 10/2004 | Aker et al. | |
| 6,850,040 B2 | 2/2005 | Xiong et al. | |
| 6,917,182 B2 | 7/2005 | Burton et al. | |
| 6,927,555 B2 | 8/2005 | Johnson | |
| 7,146,139 B2 | 12/2006 | Nevermann | |
| 7,151,411 B2 | 12/2006 | Martin et al. | |
| 7,158,804 B2 | 1/2007 | Kumaran et al. | |
| 7,170,341 B2 | 1/2007 | Conrad et al. | |
| 7,301,308 B2 * | 11/2007 | Aker | H02J 7/0042 320/139 |
| 7,549,177 B2 | 6/2009 | Diefenbaugh et al. | |
| 7,724,194 B2 | 5/2010 | Black et al. | |
| 8,013,674 B2 | 9/2011 | Drogi et al. | |
| 8,054,039 B2 | 11/2011 | Bauerle et al. | |
| 8,155,081 B1 | 4/2012 | Mater et al. | |
| 8,204,446 B2 | 6/2012 | Scheer et al. | |
| 8,232,685 B2 | 7/2012 | Perper et al. | |
| 8,269,467 B2 | 9/2012 | Li et al. | |
| 8,278,871 B2 | 10/2012 | Kallmyer | |
| 8,288,994 B2 | 10/2012 | Jakes et al. | |
| 8,427,011 B2 | 4/2013 | Jung et al. | |
| 8,436,492 B2 | 5/2013 | Jung et al. | |
| 8,538,428 B2 | 9/2013 | Bartlett | |
| 8,552,593 B2 | 10/2013 | Jung et al. | |
| 8,552,693 B2 | 10/2013 | Paryani | |
| 8,592,065 B2 | 11/2013 | Bhardwaj et al. | |
| 8,624,546 B2 | 1/2014 | Jung et al. | |
| 8,643,342 B2 | 2/2014 | Mehta et al. | |
| 8,754,614 B2 | 6/2014 | Paryani et al. | |
| 8,760,010 B2 | 6/2014 | Jung et al. | |
| 8,805,764 B1 | 8/2014 | Rhines et al. | |
| 9,246,454 B2 | 1/2016 | Schirmann et al. | |
| 9,356,461 B2 | 5/2016 | Howard et al. | |
| 9,419,457 B2 | 8/2016 | Robinson et al. | |
| 9,438,293 | 9/2016 | Slater et al. | |
| 2001/0017602 A1 | 8/2001 | Hieb | |
| 2003/0085684 A1 | 5/2003 | Tsukamoto et al. | |
| 2003/0189417 A1 | 10/2003 | Dias et al. | |
| 2003/0228875 A1 | 12/2003 | Alapuranen | |
| 2003/0228891 A1 | 12/2003 | Kobayashi et al. | |
| 2004/0075494 A1 | 4/2004 | Klomsdorf et al. | |
| 2004/0117330 A1 | 6/2004 | Ehlers et al. | |
| 2004/0176125 A1 | 9/2004 | Lee | |
| 2004/0222769 A1 | 11/2004 | Al-Anbuky et al. | |
| 2004/0257040 A1 | 12/2004 | Xiong et al. | |
| 2005/0017677 A1 | 1/2005 | Burton et al. | |
| 2005/0030094 A1 | 2/2005 | Conrad et al. | |
| 2005/0046387 A1 | 3/2005 | Aker et al. | |
| 2005/0168193 A1 | 8/2005 | Xiong et al. | |
| 2005/0253561 A1 | 11/2005 | Tibbs | |
| 2006/0028176 A1 | 2/2006 | Tang et al. | |
| 2006/0158156 A1 | 7/2006 | Gamboa | |
| 2006/0269835 A1 | 11/2006 | Song | |
| 2007/0069735 A1 | 3/2007 | Graf et al. | |
| 2007/0188139 A1 | 8/2007 | Hussain et al. | |
| 2008/0074084 A1 | 3/2008 | Lee et al. | |
| 2008/0154624 A1 | 6/2008 | O'Neil | |
| 2008/0197711 A1 | 8/2008 | Kato et al. | |
| 2008/0211455 A1 | 9/2008 | Park et al. | |
| 2008/0303480 A1 | 12/2008 | Prutchi et al. | |
| 2009/0102294 A1 | 4/2009 | Hodges et al. | |
| 2009/0131074 A1 | 5/2009 | Minier | |
| 2009/0206797 A1 | 8/2009 | Chueh et al. | |
| 2009/0295226 A1 | 12/2009 | Hodges et al. | |
| 2010/0033138 A1 | 2/2010 | Alger et al. | |
| 2010/0085010 A1 | 4/2010 | Suzuki et al. | |
| 2010/0127666 A1 | 5/2010 | Ball | |
| 2010/0127889 A1 | 5/2010 | Vogel et al. | |
| 2010/0156355 A1 | 6/2010 | Bauerle et al. | |
| 2010/0198423 A1 | 8/2010 | Hirst | |
| 2010/0198713 A1 | 8/2010 | Forbes et al. | |
| 2010/0225272 A1 * | 9/2010 | Kirby | H04B 5/00 320/108 |
| 2010/0233989 A1 | 9/2010 | Constien et al. | |
| 2010/0266066 A1 | 10/2010 | Takahashi | |
| 2010/0283691 A1 | 11/2010 | Su et al. | |
| 2011/0012562 A1 | 1/2011 | Paryani | |
| 2011/0018346 A1 | 1/2011 | Dixon | |
| 2011/0037439 A1 | 2/2011 | Bhardwaj et al. | |
| 2011/0070848 A1 | 3/2011 | Reddy | |
| 2011/0071597 A1 | 3/2011 | Aghassian | |
| 2011/0090126 A1 | 4/2011 | Szini et al. | |
| 2011/0119005 A1 | 5/2011 | Majima et al. | |
| 2011/0121836 A1 | 5/2011 | Kim et al. | |
| 2011/0140538 A1 | 6/2011 | Jung et al. | |
| 2011/0151942 A1 | 6/2011 | Hanley et al. | |
| 2011/0156661 A1 | 6/2011 | Mehta et al. | |
| 2011/0222469 A1 | 9/2011 | Ali et al. | |
| 2011/0275369 A1 | 11/2011 | Bartlett et al. | |
| 2011/0291619 A1 | 12/2011 | Asakura | |
| 2011/0316475 A1 | 12/2011 | Jung et al. | |
| 2012/0021800 A1 | 1/2012 | Wilson et al. | |
| 2012/0032646 A1 | 2/2012 | Lee | |
| 2012/0071195 A1 | 3/2012 | Chakraborty et al. | |
| 2012/0146576 A1 | 6/2012 | Partovi | |
| 2012/0147801 A1 | 6/2012 | Ho et al. | |
| 2012/0210325 A1 | 8/2012 | de Lind van Wijngaarden et al. | |
| 2012/0213172 A1 | 8/2012 | Kim et al. | |
| 2012/0235636 A1 | 9/2012 | Partovi | |
| 2012/0242906 A1 | 9/2012 | Shintani et al. | |
| 2013/0020862 A1 | 1/2013 | Miller | |
| 2013/0069658 A1 * | 3/2013 | Rich | G01R 31/3606 324/426 |
| 2013/0121194 A1 | 5/2013 | Heshmati | |
| 2013/0122827 A1 | 5/2013 | Ali et al. | |
| 2013/0169348 A1 | 7/2013 | Shi | |
| 2013/0237254 A1 | 9/2013 | Papakipos et al. | |
| 2013/0249479 A1 | 9/2013 | Partovi | |
| 2013/0257359 A1 | 10/2013 | Sakai et al. | |
| 2014/0068288 A1 | 3/2014 | Robinson et al. | |
| 2014/0070761 A1 | 3/2014 | Labbe et al. | |
| 2014/0070762 A1 | 3/2014 | Jenwatanavet et al. | |
| 2014/0084856 A1 | 3/2014 | Howard et al. | |
| 2014/0092243 A1 | 4/2014 | Ichikawa | |
| 2014/0097671 A1 | 4/2014 | Nakamura et al. | |
| 2014/0176067 A1 | 6/2014 | Suzuki et al. | |
| 2014/0232330 A1 | 8/2014 | Robertson et al. | |
| 2014/0253023 A1 | 9/2014 | Paryani | |
| 2014/0266462 A1 | 9/2014 | Schirmann et al. | |
| 2014/0274188 A1 | 9/2014 | Thorson et al. | |
| 2015/0064528 A1 | 3/2015 | Liu et al. | |
| 2015/0234054 A1 | 8/2015 | Lennen et al. | |
| 2015/0349372 A1 | 12/2015 | Maleki et al. | |
| 2015/0379533 A1 | 12/2015 | Alberth et al. | |
| 2016/0043752 A1 | 2/2016 | Slater et al. | |

FOREIGN PATENT DOCUMENTS

| | | |
|---|---|---|
| EP | 1505725 | 7/2009 |
| EP | 2077682 | 7/2009 |

(56) References Cited

FOREIGN PATENT DOCUMENTS

| | | |
|---|---|---|
| EP | 2222371 | 5/2011 |
| EP | 2595269 A1 | 5/2013 |
| JP | H09247852 | 9/1997 |
| JP | 2003333200 | 11/2003 |
| WO | WO-9306682 | 4/1993 |
| WO | WO-2011084367 | 7/2011 |
| WO | WO-2011090769 | 7/2011 |
| WO | WO-2013152149 | 10/2013 |

OTHER PUBLICATIONS

"Ex Parte Quayle Action", U.S. Appl. No. 13/625,976, Dec. 11, 2015, 11 pages.

"Ex Parte Quayle Action", U.S. Appl. No. 14/108,544, Apr. 23, 2015, 8 pages.

"Ex Parte Quayle Action", U.S. Appl. No. 14/451,950, Aug. 4, 2015, 7 pages.

"Final Office Action", U.S. Appl. No. 13/477,609, Jul. 31, 2015, 11 pages.

"Final Office Action", U.S. Appl. No. 13/625,976, Jun. 5, 2015, 40 pages.

"Final Office Action", U.S. Appl. No. 13/798,682, Jul. 30, 2015, 12 pages.

"First Choice Power", http://www.firstchoicepower.com/plans-services/electricity-plans/variable-rate-electricity-plans.aspx—Retrieved on May 18, 2012, 1 page.

"How Does Prepaid Electricity Work", http://www.mxenergy.com/does-prepaid-electricity-work-a-19.html—Retrieved on Jan. 15, 2012, 3 pages.

"International Preliminary Report on Patentability", Application No. PCT/US2013/054623, Apr. 9, 2015, 12 pages.

"International Preliminary Report on Patentability", Application No. PCT/US2013/060170, Mar. 24, 2015, 6 pages.

"International Preliminary Report on Patentability", Application No. PCT/US2013/042042, Mar. 10, 2015, 8 pages.

"International Preliminary Report on Patentability", Application No. PCT/US2014/014994, Sep. 15, 2015, 8 pages.

"International Search Report and Written Opinion", Application No. PCT/US2014/070384, Mar. 13, 2015, 12 pages.

"International Search Report and Written Opinion", Application No. PCT/US2014/014994, Mar. 21, 2014, 12 pages.

"International Search Report and Written Opinion", Application No. PCT/US2013/054623, May 14, 2014, 14 pages.

"International Search Report and Written Opinion", Application No. PCT/US2013/040242, Oct. 4, 2013, 14 pages.

"International Search Report and Written Opinion", Application No. PCT/US2014/018479, Jul. 22, 2014, 17 pages.

"International Search Report and Written Opinion", Application No. PCT/US2013/060170, Dec. 5, 2013, 8 pages.

"Non-Final Office Action", U.S. Appl. No. 13/477,609, Dec. 3, 2014, 7 pages.

"Non-Final Office Action", U.S. Appl. No. 13/477,609, Dec. 14, 2015, 9 pages.

"Non-Final Office Action", U.S. Appl. No. 13/621,857, Nov. 14, 2014, 5 pages.

"Non-Final Office Action", U.S. Appl. No. 13/625,976, Feb. 5, 2015, 38 pages.

"Non-Final Office Action", U.S. Appl. No. 13/798,682, Feb. 17, 2015, 10 pages.

"Non-Final Office Action", U.S. Appl. No. 13/798,682, Dec. 4, 2015, 13 pages.

"Non-Final Office Action", U.S. Appl. No. 14/457,190, Sep. 18, 2015, 25 pages.

"Notice of Allowance", U.S. Appl. No. 13/621,857, Jan. 26, 2015, 7 pages.

"Notice of Allowance", U.S. Appl. No. 13/621,857, May 11, 2015, 5 pages.

"Notice of Allowance", U.S. Appl. No. 14/108,544, Oct. 15, 2015, 6 pages.

"Restriction Requirement", U.S. Appl. No. 13/621,857, Aug. 18, 2014, 7 pages.

"Your Choice Your Plan", GreyStone Power Corporation, http://www.greystonepower.com/UploadedFiles/pdf/prepaid%20brochure.pdf—Retrieved on Jun. 4, 2012, 2 pages.

Park,"Energy Maps for Large-scale, Mobile Wireless Networks", IEEE International Conference on Communications, 2007, Jun. 24, 2007, 6 pages.

"Final Office Action", U.S. Appl. No. 14/457,190, Mar. 3, 2016, 33 pages.

"Notice of Allowance", U.S. Appl. No. 13/477,609, Apr. 11, 2016, 5 pages.

"Notice of Allowance", U.S. Appl. No. 13/625,976, Mar. 3, 2016, 8 pages.

"Notice of Allowance", U.S. Appl. No. 14/451,950, Jan. 15, 2016, 5 pages.

"Supplemental Notice of Allowance", U.S. Appl. No. 13/625,976, Mar. 24, 2016, 5 pages.

"Supplemental Notice of Allowance", U.S. Appl. No. 14/451,950, Jan. 29, 2016, 2 pages.

Corrected Notice of Allowance, U.S. Appl. No. 13/625,976, May 4, 2016, 2 pages.

Non-Final Office Action, U.S. Appl. No. 14/293,182, May 20, 2016, 10 pages.

Notice of Allowance, U.S. Appl. No. 13/798,682, Jun. 20, 2016, 10 pages.

Notice of Allowance, U.S. Appl. No. 14/451,950, Apr. 22, 2016, 5 pages.

Supplemental Notice of Allowance, U.S. Appl. No. 13/477,609, Jun. 16, 2016, 2 pages.

Supplemental Notice of Allowance, U.S. Appl. No. 14/451,950, Jun. 10, 2016, 2 pages.

Supplemental Notice of Allowance, U.S. Appl. No. 14/451,950, Aug. 3, 2016, 2 pages.

* cited by examiner

| CYCLE LIFE : | 500 CYCLES | 800 CYCLES |
|---|---|---|
| BATTERY 1 | 0.7C | 0.3C |
| BATTERY 2 | 0.5C | 0.3C |
| BATTERY 3 | 0.7C | 0.4C |
| BATTERY 4 | 1.0C | 0.7C |
| BATTERY 5 | 0.5C | 0.3C |
| BATTERY 6 | 0.5C | 0.3C |
| BATTERY 7 | 0.7C | 0.5C |
| BATTERY 8 | 0.7C | 0.5C |
| BATTERY 9 | 0.4C | 0.2C |

BATTERY CYCLE LIFE THROUGH SMART OVERNIGHT CHARGING

TECHNICAL FIELD

The present disclosure relates in general to method for charging a rechargeable battery within a user equipment. More particularly, the present disclosure relates to charging a rechargeable battery within a user equipment in order to improve the battery's cycle life by providing a decreased charge rate during a period of time when the user equipment is being charged and has a high probability of not being used actively by the user.

BACKGROUND

Batteries, and in particular rechargeable batteries, have a finite life due to the occurrence of unwanted chemical or physical changes to, or the loss of, the active materials of which they are made. Without the unwanted chemical or physical changes, rechargeable batteries could last indefinitely over an infinite number of charge cycles, wherein the charge cycle is defined as the complete charging and complete discharging of the rechargeable battery. The unwanted chemical or physical changes to the active materials within a rechargeable battery are usually irreversible and affect the electrical performance of the rechargeable battery or cell over time.

Battery cycle life is defined as the number of complete charge-discharge cycles a battery can perform before its full charge capacity falls below 80% of its initial full charge capacity. A battery's capacity is usually rated in milliamp hours (mAh). Two key factors that affect a battery's cycle life are change rate and a number N of charge-discharge cycles completed.

A battery cycle life of 300 to 1200 cycles is typical depending on various factors including how fast the battery is recharged. The aging process of the battery results in a gradual reduction in the full charge capacity over time. That is when a cell reaches its specific lifetime it does not stop working suddenly. Instead, the aging process continues at a rate wherein a cell or battery whose capacity had fallen to 80% after 500 cycles will probably continue working to 1000 cycles, but its effective capacity will continue to fall. Thus, there is no need to fear sudden death when a rechargeable cell reaches the end of its specified battery life.

Mobile communication devices, such as mobile phones, tablet pads, personal digital assistants (PDAs), laptop computers and the like (hereinafter user equipment (UE)) often use lithium-ion batteries. It is the nature of lithium-ion batteries and other rechargeable batteries such as nickel-metal hydride, lithium polymer, and NiCad batteries (hereinafter referred to as a "rechargeable batteries" or "batteries") after many charge-discharge cycles of the batteries, to lose their ability to recharge to their original capacity. In other words, after many charge cycles of the battery, the battery stores or holds a lower maximum mAh.

From a user's perspective, this means that a UE having a rechargeable battery that originally operated for 18 to 20 hours between requiring a battery charge will, over time, only operate for about 14 to 16 hours before being fully discharged and requiring a battery recharge.

Presently, UEs having rechargeable batteries are designed to charge their rechargeable batteries as quickly as possible. For example, many manufacturers would like the rechargeable batteries of a UE to charge within about 1 to 2 hours. Ideally, many manufacturers want the charge time to be as short as possible so that the user waits a minimal amount of time before being able to use his fully charged UE again.

It has been found that charging a rechargeable battery at the maximum charge rate minimizes the number of charge cycles in a battery's cycle life. Alternatively, it is known that one way to increase the number of charge cycles in the cycle life of a rechargeable battery is to charge the rechargeable battery at a slower rate over a longer period of time.

What is needed is a system and method for recharging a battery in a UE and at a reduced charge rate in order to increase the number of charge cycles in the cycle life of the UE's rechargeable battery. Furthermore, what is needed is a system and method for recharging the battery in a UE at a decreased charge rate during a time period when the user is unlikely to be actively using the UE and to recharge the battery of the UE and alternatively at a maximum charge rate when the user is most inconvenienced by having to wait an extended period of time for the rechargeable battery of the UE to be recharged.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of the system and method for improved battery cycle life through smart overnight charging are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

It would be advantageous to increase the number of charge cycles in the cycle life of a battery without requiring the user to wait extended periods of time, due to a decreased battery charging rate, when the user needs the rechargeable battery recharged quickly. In order to achieve this, it would be advantageous to charge the UE's rechargeable battery more slowly when the UE determines that the user will most likely not need a fully charged battery in less than about 1½ hours (e.g., 1 to 2 hours).

Various embodiments determine whether the user of the UE will most likely need a fully charged battery in less than or greater than about 1½ hours from a time that UE is connected to an external charging device. Embodiments check whether an alarm clock application, which is processed by a processor within the UE, has been set to alarm within about 1½ hours, along with a few other criteria in order to determine whether the battery of the UE can be charged at a slower rate or needs to be charged at a maximum charge rate.

Figure 1:
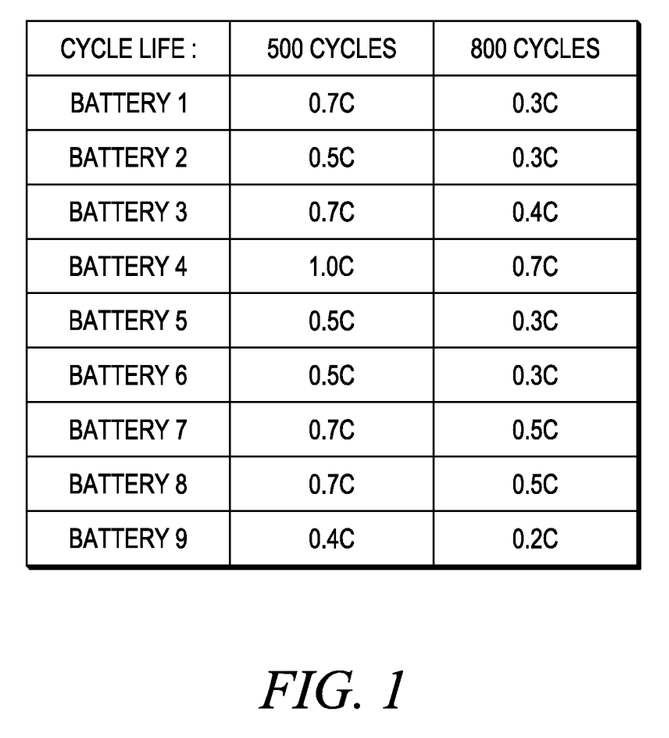
FIG. 1 provides a chart indicating the additional number of charge cycles available in the cycle life of different batteries charged at different decreased charge rate percentages of a maximum charge rate.

FIG. 1 provides a chart showing the charge rate of various rechargeable batteries (battery 1-battery 9). Here the maximum charge rate for each battery is designated as C. For this chart, the maximum charge rate C is the charge rate at which the rechargeable battery can be charged from 0 mAh to full capacity mAh in one hour. Thus, charging a same battery at 0.5 C would take two hours. The center column of FIG. 1, titled Cycle life of 500 Cycles indicates the charge rate of each battery resulting in a cycle life of 500 cycles. For example, battery 1 is charged at 0.7 C and then completely discharged in a cyclic manner until battery 1 could only be charged to 80% of its original maximum mAh charge. Using this method it was found that battery 1 had a cycle life of 500 cycles when charged at 0.7 C. As shown in the right hand column, cycle life of 800 cycles, when another battery 1 was charged at 0.3 C and then discharged cyclically, it was found that battery 1 had a cycle life of 800 cycles. Similarly, for batteries 2-9 shown in FIG. 1, each battery when charged at a decreased charge rate, had an increased cycle life when compared to the same battery charged at a higher charge rate.

Many UE users charge their UE overnight while they are sleeping, which also happens to be during a time when the amount of time required to recharge the phone is relatively unimportant to the user and is greater than 1 to 2 hours. That is, it is unlikely that the user will actively use the phone while they are sleeping. In this situation, where a user generally sleeps for more than about 1½ hours at night and is only concerned that the phone is fully charged when he or she wakes up, embodiments can be set to charge the battery at a decreased charge rate in order to increase the number of cycles in the cycle life of the UE's battery. In various embodiments, the decreased charge rate can be set to a fixed decreased charge rate that is fixed at between 1 and 99% of the maximum charge rate that a charging circuit in the UE can charge the battery. Alternatively, in other embodiments, the fixed decreased charge rate may be a charge rate that is between 1 and 99% of a maximum charge rate the UE's charging circuit can charge the battery based on an amount of power provided to the UE from an external charger, such as a power adapter that converts AC voltage to a to a DC supply voltage, an external powerpack or external rechargeable phone charger device.

In one embodiment, for example, when a user sets the alarm clock application on their mobile terminal or UE for 6 AM, and the processor within the UE senses, via a charging circuit within the UE that the charging circuit is being connected to an external power source at 9 PM in the evening, the UEs processor can be configured to signal and adjust the charging rate of the UE's charging circuit to charge the battery at a decreased charging rate, wherein the decreased charging rate is less than the maximum charge rate of the UE's charging circuit.

In other embodiments, the decrease charge rate can be selected from one of a plurality of decreased charge rates that are each lower than the maximum charge rate. Each one of the plurality of decreased charge rates can be selected based on the amount of time in the future from the present time that the alarm clock application will sound the alarm (the delta time) and wake user. Here, a selected one of the plurality of decreased charge rates is selected to coincide with or be less than the delta time until the alarm clock application sounds the alarm to wake the user. In some embodiments, the expected idle time of the UE is, for example the measure of time between when the user connects the UE to an external charger in the evening and the time that the user has set the alarm application to sound or alarm (i.e., the delta time).

In other embodiments, the UE, via the internal charging circuit and the processor, detects that the UE has been connected to a charging device for an overnight charge based on alarm being set for an AM hour (e.g., between 4 AM and 10 AM) and that the user connected the UE to the external charger in the evening (e.g., between 6 PM and 1 AM). If these two criteria are sent by the charging application running on the processor, the processor sets or signals the internal charging circuit of the UE to charge the battery at a decreased charge rate, otherwise the processor will signal the internal charging circuit to charge the battery at a maximum or normal charge rate such that the battery will charge within about 1½ hours.

In some embodiments the UE comprises components that can perform basic logic functions to determine whether the UE is connected to an external charging device that is providing power to the internal charging circuit and determine whether the alarm application is set for more than, for example, 1½ to 3 hours in the future. In this embodiment, if the alarm is set for less than three hours in the future, the battery will be charged at the maximum or higher charge rate. Conversely, if the alarm is set for a delta time of more than three hours into the future, the charge rate can be set to a decreased charge rate and the battery will also be completely charged at or by a time prior to the alarm time.

Figure 2:
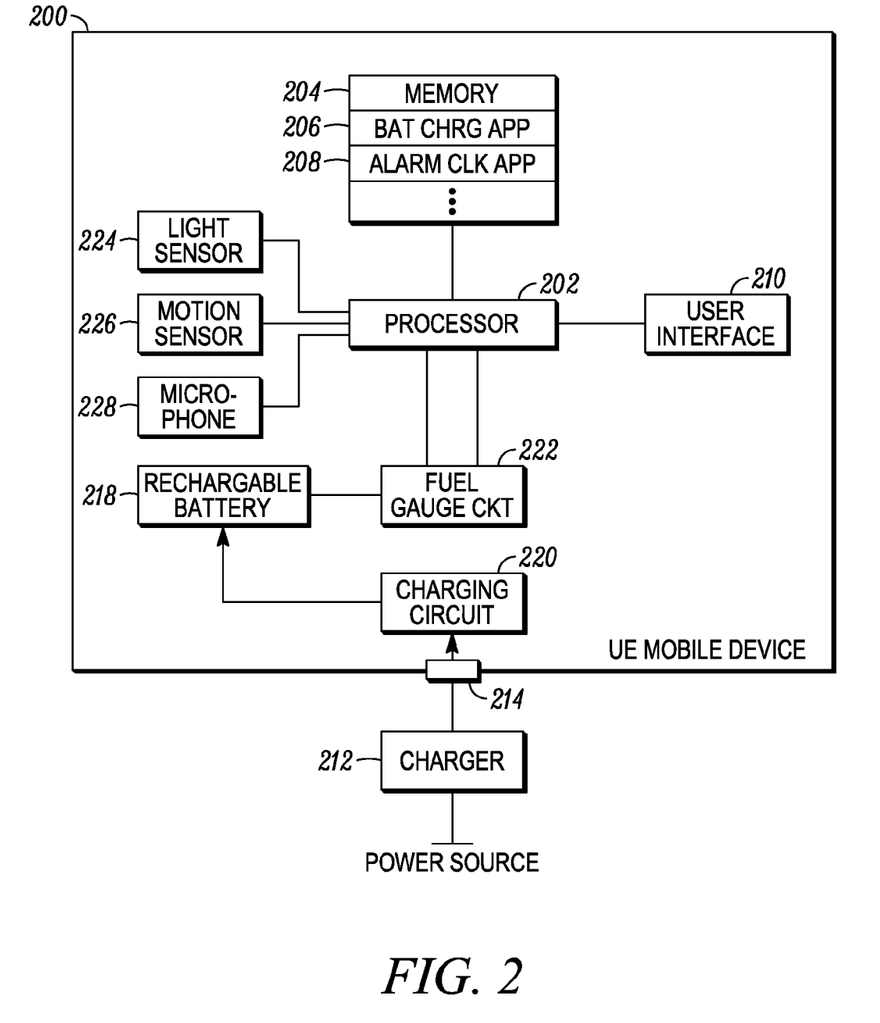
FIG. 2 illustrates a block diagram of a UE incorporating an embodiment of a UE that improves battery cycle life.

Referring to FIG. 2 a block diagram of a UE embodiment is depicted. The UE 200 can be any mobile communication or mobile terminal device such as a mobile phone, a mobile terminal, a smartphone, a tablet pad, a personal digital assistant (PDA), a laptop computer, or any portable rechargeable device that has a programmable alarm clock function. The UE 200 has one or more processors 202 that uses various applications, operations and circuits within the UE 200. For example, UE 200 has a memory 204 that may have various applications with instructions for the processor 202 use. Here the memory 204 includes a battery charge application 206 and an alarm clock application 208. The processor 202 is also connected to a user interface 210. The user interface 210 may include a touchable display screen and buttons for a user to interface with the UE 200 and set and operate various applications, controls, settings and functions available to the user via applications stored in memory 204 and/or other electronics in the UE. For example, a user may select and run the alarm application 208 on the user interface 210. While in the alarm clock application 208, the user may set an alarm time for when the alarm clock is to sound. The user may set the alarm to be operational in the evening prior to going to sleep such that the alarm time is set to sound or alarm in the morning to wake the user up. Alternatively, the user may set the alarm clock to alarm every day or on only selected days. Prior to going to sleep the user may connect an external charger 212 to a connector 214 on the UE 200. The external charger 212 may also be connected to a power source 216, such as a wall socket or a rechargeable battery pack used for recharging mobile communication devices or other devices having lithium-ion or other types of rechargeable batteries therein.

Furthermore, the UE 200 includes a rechargeable battery 218 (herein also referred to as "a battery") that is connected to a charging circuit 220 and a fuel gauge circuit 222. The charging circuit 220 is connected to the connector 214 or is adapted to be connected to the external charger 212. The fuel gauge circuit 222 monitors the power level of the battery and provides information to the processor 202. The charging circuit 220 is configured to be able to charge the battery at a maximum charging rate based on the amount of power provided to the charging circuit from the external charger 212. Additionally, the charging circuit 220 can be instructed by the processor, via a decreased charge rate signal, to charge the battery at a decreased charge rate. The decrease charge rate is a rate that is less than the maximum charge rate. In some embodiments, the charging circuit 220 is configured to provide a plurality of decreased charge rates that will charge the battery 218 from, for example, a discharged state to a charged state in different amounts of time, wherein the maximum charge rate will charge a discharged battery 218 in a least amount of time.

The UE also comprises a light sensor 224 that is adapted to sense or measure an amount of ambient light outside of the UE. In some embodiments, the light sensor is an integral part of a camera incorporated into the UE. The light sensor 224 senses the amount of ambient light or lumens about the UE and provides a signal indicative of the amount of lumens sensed to the processor.

The UE may also comprise a motion sensing circuit 226 that is configured to sense, among other things, whether the UE is stationary, moving and/or, in some embodiments, accelerating in one or more directions. The motion sensing circuit 226 is also configured to provide a signal to the processor indicative of whether the UE is stationary, moving, and or accelerating in one or more directions.

Embodiments of the UE 200 may also include a microphone circuit 228 that can sense sound levels that are about, near or proximate to the UE. The microphone circuit 228 provides a sound signal to the processor 202 and/or related circuitry that is indicative of, among other things, the sound level in decibels (dB) that the microphone circuit 228 receives from the environment near, about or proximate to the UE 200.

Some embodiments have a charging circuit 220 that is configured to charge the battery 218 at a maximum charge rate or a decreased charge rate. The decreased charge rate is a charge rate that is lower than the maximum charge rate. The charging circuit 220 has an input or connector 214 adapted for connection to an external power supply, rechargeable battery pack or charger 212. The charging circuit 220 provides a signal to the processor indicative of whether the charging circuit 220 is connected to the external charger 212. When an external charger 212 is connected to the charging circuit 220 and providing power, the charging circuit may initially charge the battery 218 at a maximum charge rate.

The processor 202 follows instructions of the battery charging application 206 to check a variety of variables. The charging circuit will check to see if the alarm clock application 208 indicates that an alarm has been set. If no alarm has been set, then the processor 202 will direct or allow the charging circuit 220 to continue charging the battery 218 at a maximum charge rate. By charging the battery at a maximum charge rate, the battery should be fully charged, as determined by the fuel gauge circuit 222, in a minimum charge time of about 1 to 2 hours. Alternatively if an alarm has been set, the processor determines, in accordance with the battery charging application 206, whether the alarm time is more than the minimum charge time in the future. In other words, when the UE is connected to an external power source, the processor determines whether the amount of time between the present time and the time that the alarm is set for (the delta time) is greater than the minimum charge time of the discharged battery 218 when being charged at the maximum charge rate provided by the charging circuit 220.

In some embodiments, the fuel gauge circuit 222 will provide the processor 202 an indication of how much "fuel" charge (mAh) is present in the battery 218 via a fuel signal. The processor 202 can calculate the minimum charge time for the battery based on the battery's present charge and the maximum charge rate that the charging circuit 220 can provide to the battery. When the calculated or determined minimum charge time of a partially charged battery is greater than or equal to the delta time, then than the processor 202 will instruct the charging circuit 220 to charge the battery at the maximum charge rate.

Conversely, when the calculated or determined minimum charge time is less than the delta time, then the microprocessor 202 will signal the charging circuit to charge at a decreased charging rate. The decreased charging rate will increase the number of charge cycles in the cycle life of the rechargeable battery 218. In various embodiments, the decreased charging rate is set to a predetermined decreased charging rate that will charge the battery 218 to a full charge with in the amount of time between the present time and the alarm time.

In various embodiments other criteria is also checked by the processor 202 in order to increase the probability that the UE in a situation where it won't be disturbed between the present time and the alarm time. For example in some embodiments processor 202 also monitors the motion sensing circuit 226 to determine whether the motion sensing circuit 226 senses no movement of the UE 200 for a predetermined period of non-motion time. This assumes that the UE not moving for a predetermined amount of non-motion time is an indication that the user may have gone to bed and/or will not be disturbing the phone until the alarm sounds. After it is determined that the UE has not moved for the predetermined period of non-motion time, the processor may provide a decreased charge rate signal to the charging circuit.

In other embodiments, the probability that the UE will not be disturbed between the present time the alarm time can be increased further by the processor 202 also monitoring the light sensor 224 in order to determine whether the ambient light about the UE and received by the light sensor 224 is below predetermined luminance level for at least a low lumen time. When the ambient light about the UE is below the predetermined lumen level for the predetermined low lumen time, it is considered another indication that the UE is in a darkened room, such as a bedroom, that the user is in bed and/or will be sleeping until the alarm time. The low ambience time may be a time period of between about 1 and about 90 minutes. After it is determined that the light received by the light sensor is below the predetermined luminance level for the predetermined low ambience time, the processor may provide a decreased charge rate signal to the charging circuit.

In additional embodiments, another criteria that may be used to help determine whether the UE 200 will not be disturbed between the present time and the alarm time is by the processor 202 also monitoring the microphone 228 in order to determine whether sound about the UE is below a predetermined decibel level for a predetermined length of quiet time while monitoring the microphone. The length of quiet time may be from 1 to about 90 minutes. After it is determined that the decibel level has stayed below the predetermined decibel level for the quiet time period, it may be assumed that the user has stopped talking or listening to a sound device, is not in an active location and has decided to go to sleep and as such, the processor may provide a decreased charge rate signal to the charging circuit.

Depending on the embodiment, if any one of the one or more various criteria of non-motion, low ambient light, and/or low decibel level are not met for their predetermined amounts of time, the processor will not provide a decreased or reduced charge rate signal to the charging circuit and the charging circuit will charge the battery at the maximum charging rate regardless of the amount of time remaining between the present time and the alarm time.

Figure 3:
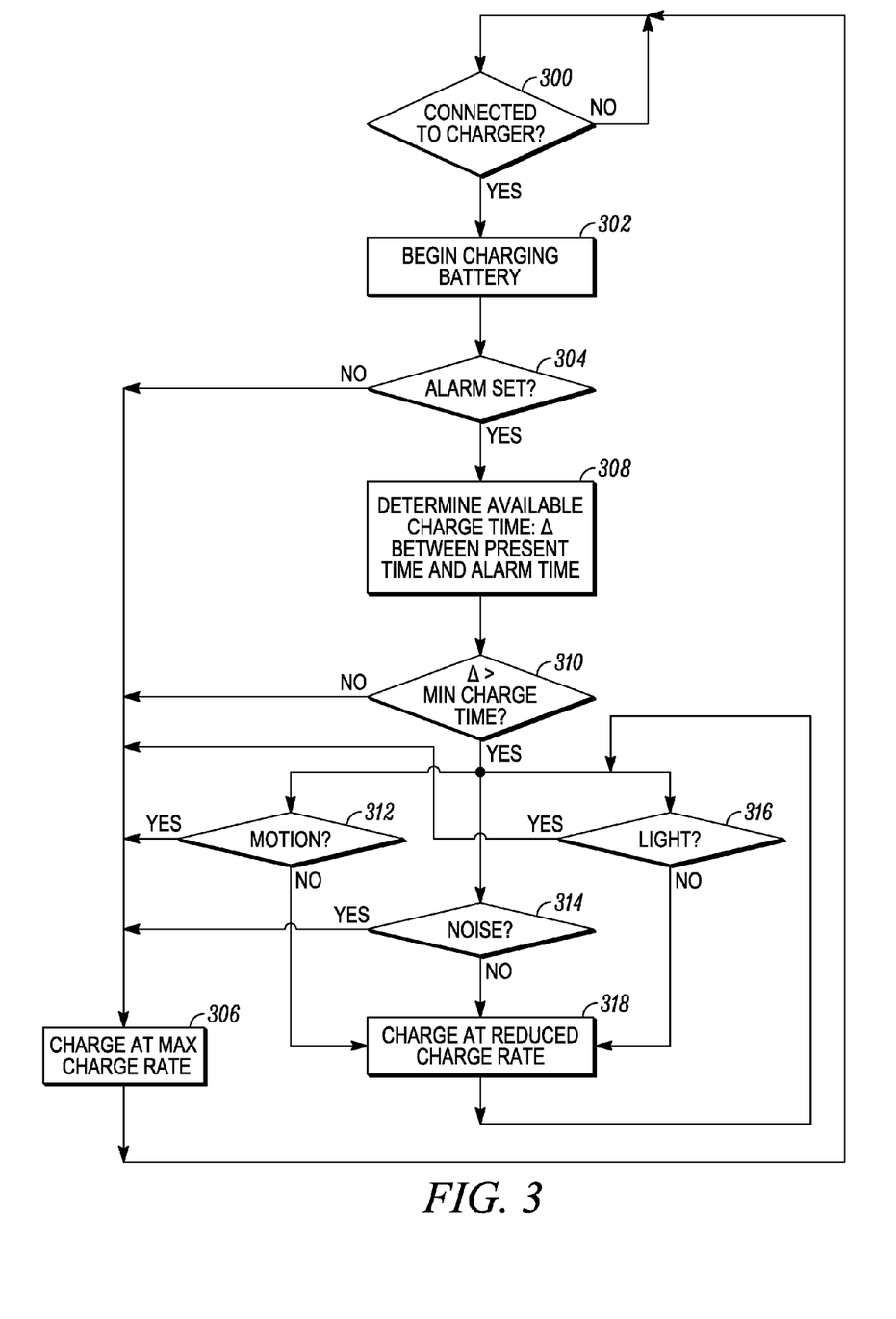
FIG. 3 is a flowchart of a method that increased the number of charge cycles in the cycle life of a UE's battery when an alarm application is used.

FIG. 3 provides a flowchart of a method of charging a battery in a UE. At step 300 the charging circuit is constantly monitoring whether it is connected to an external charger that is providing power for charging the UE's battery. In various embodiments, the processor within the UE is in electronic communication with the charging circuit in order to determine whether a power source is connected to the charging circuit of the UE. When it is determined that the charging circuit is connected to an external power source, such as a power converter, a rechargeable external power-pack, a power output from an electronic device such as a USB output, or other adaptable power source, at step 302 the charging circuit begins to charge the rechargeable battery of the UE at a maximum charging rate. It is understood that the maximum charging rate can be partially dependent on the amount of power being provided from the external power source. In various embodiments, charging the maximum charging rate will charge the battery in a minimum charge time. In various embodiments the minimum charge time can be between one and two hours. In other embodiments the minimum charge time is a calculated minimum charge time based on a measured amount of existing charge in the battery.

At step 304, the processor determines whether an alarm clock application is running and whether an alarm clock time has been set to alarm or sound in the future. If no alarm time has been set, then at step 306 the charging circuit continues to charge at the maximum charging rate. The charging circuit will continue to charge the battery at the maximum charging rate until the battery is fully charged or the user disconnects the external charger from the UE. Thus, the method may loop back to step 300 to determine whether or not the charging circuit is still connected to the external charger.

If at step 304 it is determined that the alarm clock application is set to alarm at an alarm time in the future, then at step 308 the processor determines the amount of time between the present time and the alarm time (the delta time) in accordance with the battery charge application. At step 310, the processor determines whether the delta time is greater than the minimum charge time. As discussed above, if the delta time is greater than the minimum charge time then, in some embodiments, the battery can be charged at a reduced charge rate in order to increase the number of battery charge cycles in the battery cycle life. Conversely, if the delta time is not greater than the minimum charge time then the battery will be charged that the maximum charge rate 306.

Again if the delta time is greater than the minimum charge time then at steps 312, 314 and 316 the processor will determine whether the UE is being subjected to any motion 312, noise above a predetermined decibel level 314 and/or ambient light above a predetermined brightness or lumen level during a predetermined time period from when the external charger was connected to the charging circuit of the UE. Some embodiments check for all three (motion, noise and light) criteria other embodiments check for specific ones of the three criteria depending on the time of day that the external charger is connected to the charging circuit and the delta time between the present time and the alarm set time. For example, if the UE is connected to an external charger in the early afternoon and the alarm set time is set for an early morning alarm time, it might not be prudent to check for the amount of ambient light about the UE since the UE was plugged in or connected to an external charger in the early afternoon.

Thus at steps 312, 314 and 316, if motion 312 is being sensed in the embodiment and motion is detected during the predetermined time period after the charging circuit senses that it has been connected to an external connector, or if a noise above a predetermined noise level is sensed 314 during the predetermined time period, or if the ambient light is being sensed and it is determined to be above a predetermined light lumen level for the predetermined time period, then the method moves to step 306 and charges the battery at the maximum charge rate. Alternatively, when the motion 312, the noise level 314, and/or the ambient light about the UE is sensed to be below a predetermined levels for the predetermined time period(s), then the processor at step 318 will provide a reduced charge rate signal to the charging circuit instructing the charging circuit to charge the battery at a reduced charge rate of between 1% and 99% of the maximum charge rate.

In some embodiments, while the battery is being charged at a reduced charge rate the processor may continue or loop back in the method to check the motion, noise and/or light criteria on a periodic basis to determine whether it has changed. If one or more of the criteria has changed such that motion is being sensed, an increased noise level is being sensed, and/or light above a certain lumen level is being sensed, various embodiments of the invention can switch to the maximum charge rate to help ensure that the battery will be charged quickly because the user may be getting ready to use the UE again or because the UE has initially incorrectly determined that the UE's delta time period will be longer than the minimum charge time.

In various embodiments, the charging circuit can be set to reduce the charging rate so that the battery can be charged at a selectable or variable decreased charge rate that will fully charge the battery within the delta time period. By selecting a decreased charge rate that will charge the battery within the delta time period, the number of charge cycles within the battery lifetime is increased. The more often that the rechargeable battery is charged at a charge rate that is lower than the maximum charge rate, the more of an increase in the charge-discharge cycles of the battery cycle life and longer the battery will maintain a charge capacity of greater than 80% of the original battery charge capacity when compared to always charging the battery at a maximum charge rate.

Since many UE users charge their mobile terminals or mobile communication devices overnight when the charge time for the UE's battery is not important to the user (as long as the battery is completely charged by the time the user wakes up in the morning) then detecting that the battery has been connected to a charger for an overnight charge (i.e., the alarm clock function has been set for the morning), and setting the charge rate to a lowest acceptable charge rate that will enable the rechargeable battery to be fully charged by the time the alarm clock alarms and wakes the user is perfectly acceptable to the user. Since overnight charges can often enable a decreased charge rate of less than about 0.5 C of the maximum charge rate then the user may see the cycle life of their UE's battery increase from about 400 charge-discharge cycles to about 800 or about a 200% or higher charge cycle increase for the battery cycle life.

Embodiments can enable the second and third year battery life of a UE to be greatly improved. In addition, embodiments also charge the battery as fast as possible during the day, while the UE is being charged in a moving automobile, in a noisy well lit office or in other places where the user probably would like the battery to be charged as quickly as possible (e.g., charged within one to two hours).

It will be appreciated by those skilled in the art having the benefit of this disclosure that this system and method to improve battery cycle life through smart overnight charging provides a provides a rechargeable user equipment having a charging circuit configured to charge a battery at a maximum charge rate or a decrease charge rate. The charging circuit comprises an input adapted for connection to an external charging device. Embodiments have a motion sensing circuit that senses non-movement of the rechargeable user equipment. Embodiments may also have an audio sensing circuit that senses the sound level about the rechargeable user equipment and a light sensing circuit that senses a lighting level about the UE. The processor is connected to charging circuit, the motion sensing circuit, and the audio sensing circuit is configured, via a charging application stored in memory of the UE, to determine whether an alarm has been set to alarm at a particular alarm time. The processor can further determine whether the charging circuit is receiving power from the external charger. If the processor is receiving power from the external charger, then the processor may determine whether the motion sensing circuit is (1) sensing non-movement of the UE for a predetermined continuous non-movement time, (2) sensing that the sound level about the UE has remained below a predetermined decibel level for a continuous predetermined quiet time, and/or (3) sensing that the ambient light about the UE has remained below a predetermined lumen level for a predetermined low lumen time, then the processor will signal the charging circuit to charge the battery at a decreased charging rate, otherwise the process will signal the charging circuit to charge the battery at a maximum charge rate. Accordingly, embodiments can increase the cycle life of a UE's battery from 300 cycles to over 800 cycles (more than 200%) when the alarm clock is used regularly and the mobile device is being charged overnight. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the concepts and scope hereof, as defined by the following claims. Thus, it is intended that the following claims be interpreted to embrace all such further modifications, changes, rearrangements, substitutions, alternatives, design choices, and embodiments.

What is claimed is:

1. The rechargeable user equipment comprising:
   a charging circuit configured to charge a battery at a maximum charge rate or a decreased charge rate, the charging circuit comprising an input adapted for connection to a charging device;
   a motion sensing circuit for sensing non-movement of the rechargeable user equipment;
   an audio sensing circuit for sensing a sound level about the rechargeable user equipment;
   a processor, connected to the charging circuit, the motion sensing circuit and the audio sensing circuit, the processor configured to:
   enable a user of the rechargeable user equipment to set an alarm clock function to alarm at an alarm time;
   determine whether the charging circuit is receiving power at the input;
   determine whether the motion sensing circuit has sensed non-movement for a predetermined non-movement time; and
   determine whether the audio sensing device has sensed that the sound level has been below a predetermined decibel level for a predetermined quiet time;
   when the set time is more than a delta time in the future, the processor provides a decreased charge rate signal to the charging circuit when power is being received at the input, non-movement has been sensed for the non-movement time, and the sound level has been below the predetermined decibel level for the predetermined quiet time, otherwise the processor provides a maximum charge rate signal to the charging circuit.

2. The rechargeable user equipment of claim 1, further comprising a light sensing circuit, connected to the processor, wherein the processor is further configured to determine whether the ambient light about the rechargeable user equipment is below a predetermined lumen level; and
   wherein when the set time is more than the delta time in the future, the processor provides a decreased charge rate signal to the charging circuit when power is being received at the input, non-movement has been sensed for the non-movement time, the sound level has been below the predetermined decibel level for the predetermined quiet time, and the ambient light is below the predetermined lumen level, otherwise the processor provides a maximum charge rate signal to the charging circuit.

3. The rechargeable user equipment of claim 1, wherein the charging circuit is configured to charge the battery at the decreased charge rate when receiving the decreased charge rate signal.

4. The rechargeable user equipment of claim 1, wherein the decreased charge rate is less than the maximum charge rate.

5. The rechargeable user equipment, of claim 1, wherein the decreased charge rate signal is configured to set the charge rate of the charging circuit to a charge rate to a variable charge rate that is below the maximum charge rate.

6. The rechargeable user equipment of claim 5, wherein the processor determines the charging information based on a maximum mAh of the battery, the present charge of the battery and an amount of time between the present time and the alarm time.

7. The rechargeable user equipment of claim 1, wherein the rechargeable user equipment is a mobile communication device.

8. A method of charging a battery in a user device comprising:
   sensing, by a charging circuit in the user device, that the charging circuit is receiving power from an external power source; and
   determining, by a processor, whether a user set alarm clock event will occur more than a minimum charge time of the battery in the future; and
   wherein when the user set alarm clock event is determined to occur more than the minimum charge time of the battery in the future, then charging the battery by the charging circuit at a reduced charge rate, the reduced charge rate being from 1 to 99 percent of a maximum charge rate, otherwise charging the battery at the maximum charge rate.

9. The method of claim 8, wherein prior to determining whether the user set alarm clock event will occur more than the minimum charge time in the future, the method further comprises charging, by the charging circuit, the battery at the maximum charge rate.

10. The method of claim 8, wherein determining further comprises:
   determining whether the user device has been stationary for a non-movement time; and
   wherein when the user set alarm clock event is determined to occur more than the minimum charge time in the future and the user device has been stationary for at least the non-movement time, then charging the battery by the charging circuit at the reduced charge rate.

11. The method of claim 8, wherein determining further comprises:
   determining whether sound about the user device has been below a predetermined decibel level for a predetermined quiet time; and
   wherein when the user set alarm clock event is determined to occur more than the minimum charge time in the future and the sound about the user device has been below the predetermined decibel level for at least the predetermined quiet time, then charging the battery by the charging circuit at the reduced charge rate.

12. The method of claim 8, wherein determining further comprises:
   determining whether the light level about the user device is below a predetermined lumen level for at least a predetermined low lumen time; and
   wherein when the user set alarm clock event is determined to occur more than the predetermined time in the future and the ambient light about the user device has been below the predetermined lumen level for at least the predetermined low lumen time, then charging the battery by the charging circuit at the reduced charge rate.

13. The method of claim 8, wherein the rechargeable user device is a mobile communication device.

14. The method of claim 8, wherein charging further comprises, charging the battery at the reduced rate such that the battery will be fully charged after the minimum charge time and before the alarm time.

15. A mobile communication device comprising:
   a light sensor;
   a motion sensor;
   a sound sensor;
   a battery;
   a user interface;
   a fuel gauge circuit connected to the battery;
   a charging circuit configured to charge the battery and adapted for connection to a power source;
   a processor connected to the light sensor, the motion sensor, the sound sensor, the user interface, the fuel gauge circuit and the charging circuit; the processor configured to:
      identify an existence of an alarm event occurring at an alarm time in the future;
      determine whether the alarm time is greater than a minimum charge time for charging the battery;
      when the alarm time is further in the future than the minimum charge time, set the charging circuit to charge the battery at a decreased charge rate, otherwise set the charging circuit to charge the battery at a maximum charge rate, wherein the decreased charge rate is a lower charging rate than the maximum charge rate.

16. The mobile communication device of claim 15, wherein the processor is further configured to receive a motion signal from the motion sensor and determine whether the mobile communication device has been stationary for at least a stationary time period;
   wherein when the processor determines that the alarm time is further in the future than the minimum charge time and that the mobile communication device has been stationary for at least the stationary time period, then the processor is configured to set the charging circuit to charge the battery at the decreased charge rate.

17. The mobile communication device of claim 15, wherein the processor is further configured to receive a sound signal from the sound sensor and determine whether the sound level about the mobile communication device has remained below a predetermined sound level for at least a quiet time period;
   wherein when the processor determines that the alarm time is further in the future than the minimum stationary time and that the sound level about the mobile communication device has remained below the predetermined sound level for the predetermined quiet time, then the processor is configured to set the charging circuit to charge the battery at the decreased charge rate.

18. The mobile communication device of claim 15, wherein the processor is further configured to receive a light signal from the light sensor and determine whether a lumen level about the mobile communication device has remained below a predetermined lumen level for a predetermined low lumen time period;
   wherein when the processor determines that the alarm time is further in the future than the minimum stationary time and the ambient light about the mobile communication device has remained below the predetermined luminance for at least the predetermined dark time, then the processor is configured to set the charging circuit to charge the battery at the decreased charge rate.

* * * * *